United States Patent
Sajassi et al.

(10) Patent No.: US 9,553,737 B2
(45) Date of Patent: Jan. 24, 2017

(54) MODIFYING BACKBONE SERVICE INSTANCE IDENTIFIERS BASED ON AN IDENTIFIED FLOW OF ASSOCIATED FRAMES

(75) Inventors: Ali Sajassi, San Ramon, CA (US); Samer M Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 334 days.

(21) Appl. No.: 13/294,164

(22) Filed: Nov. 10, 2011

(65) Prior Publication Data

US 2013/0121150 A1 May 16, 2013

(51) Int. Cl.
*H04L 12/28* (2006.01)
*H04L 12/46* (2006.01)
*H04L 12/851* (2013.01)

(52) U.S. Cl.
CPC ....... *H04L 12/4633* (2013.01); *H04L 12/4662* (2013.01); *H04L 12/462* (2013.01); *H04L 47/24* (2013.01); *H04L 47/2483* (2013.01)

(58) Field of Classification Search
None
See application file for complete search history.

(56) References Cited

U.S. PATENT DOCUMENTS

| | | | | | |
|---|---|---|---|---|---|
| 7,626,930 B2 * | 12/2009 | Agmon | ............... | H04L 12/4641 | 370/230 |
| 7,697,528 B2 * | 4/2010 | Parry | ................. | H04L 12/4633 | 370/389 |
| 7,886,080 B2 * | 2/2011 | Sajassi | ............... | H04L 12/4625 | 370/254 |
| 7,903,676 B2 * | 3/2011 | Sajassi | ............... | H04L 12/4658 | 370/401 |
| 8,416,790 B1 * | 4/2013 | Busch | ................... | H04L 12/462 | 370/401 |
| 8,619,784 B2 * | 12/2013 | Figueira | ............... | H04L 12/462 | 370/285 |
| 2007/0098006 A1 * | 5/2007 | Parry | .................. | H04L 12/4633 | 370/437 |
| 2008/0112323 A1 * | 5/2008 | Agmon | ............... | H04L 12/4641 | 370/235 |

(Continued)

OTHER PUBLICATIONS

"Implementing IEEE 802.1ah Provider Backbone Bridge," downloaded Nov. 2, 2011, Cisco Systems, Inc., San Jose, CA, USA (twenty-four pages).

*Primary Examiner* — Marsha D Banks Harold
*Assistant Examiner* — Christopher Wyllie
(74) *Attorney, Agent, or Firm* — The Law Office of Kirk D. Williams

(57) ABSTRACT

In one embodiment, backbone service instance identifiers (I-SIDs) of backbone frames are modified based on flow identification of frames encapsulated therein to induce entropy into the headers of the backbone frames. Backbone packet switching devices use the modified service instance identifier to load balance the corresponding frame through the backbone network. At an exit point of the backbone network, the original backbone service instance identifier (I-SID) associated with a frame encapsulated in a backbone frame is recovered from the modified service instance identifier, with this recovery typically including determining the flow identification of the frame encapsulated in the backbone frame.

12 Claims, 5 Drawing Sheets

(56) References Cited

U.S. PATENT DOCUMENTS

| | | | |
|---|---|---|---|
| 2009/0196298 A1* | 8/2009 | Sajassi | H04L 12/4658 370/395.53 |
| 2010/0074102 A1* | 3/2010 | Mutoh | H04L 12/413 370/225 |
| 2010/0142537 A1* | 6/2010 | Lee | H04L 45/00 370/395.53 |
| 2013/0077624 A1* | 3/2013 | Keesara | H04L 12/4633 370/390 |
| 2013/0121150 A1* | 5/2013 | Sajassi | H04L 12/4633 370/235 |

* cited by examiner

MODIFYING BACKBONE SERVICE INSTANCE IDENTIFIERS BASED ON AN IDENTIFIED FLOW OF ASSOCIATED FRAMES

TECHNICAL FIELD

The present disclosure relates generally to communicating information with remote device over a network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

In a Provider Backbone Bridging architecture, customer networks (e.g., using 802.1q bridging) are aggregated into Provider Bridged networks (e.g., using 802.1ad). These, in turn, are aggregated into Provider Backbone Bridging networks which use the 802.1 ah frame format. The frame format employs a MAC tunneling encapsulation scheme for tunneling customer Ethernet frames within provider Ethernet frames across the Provider Backbone Bridging network. A VLAN ID is used to segregate the backbone into broadcast domains or topologies, and a 24-bit service identifier (I-SID) is defined and used to associate a given customer MAC frame with a provider service instance.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
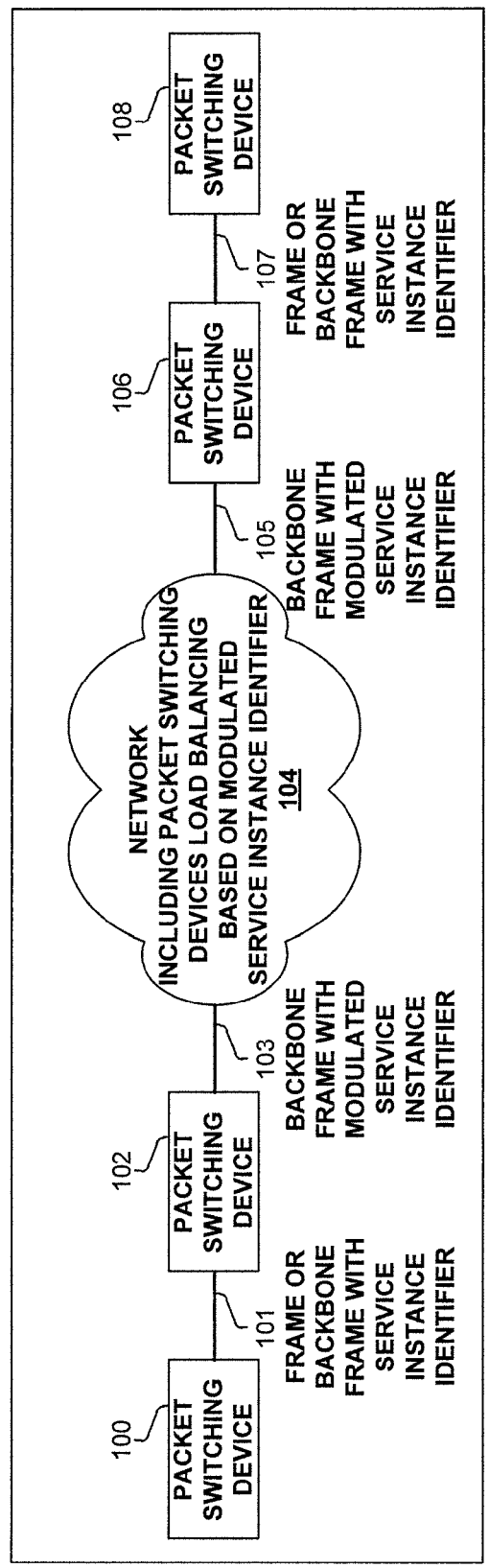
FIG. 1 illustrates an example network according to one embodiment.

Disclosed are, inter alia, methods, apparatus, computer-storage media, mechanisms, and means associated with modifying backbone service instance identifiers (I-SIDs) of backbone frames based on flow identification of frames encapsulated therein. One embodiment includes: determining a flow identification value derived from one or more fields of the header of a particular frame; generating a modulated service instance identifier, which includes: modulating a backbone service instance identifier (I-SID) associated with the particular frame with the flow identification value to generate the modulated service instance identifier; and sending, from a first packet switching device into a network, a backbone frame encapsulating the particular frame, with the header of the backbone frame including the modulated service instance identifier. One embodiment includes: receiving, by the first packet switching device, the particular frame; determining, by the first packet switching device, the backbone service instance identifier (I-SID) corresponding to the particular frame; and encapsulating the particular frame to produce the backbone frame, with the header of the backbone frame including the modulated service instance identifier.

One embodiment includes: a second packet switching device in the network communicating the backbone frame to a third packet switching device; wherein said communicating includes load balancing the backbone frame across a plurality of links based on using the modulated service instance identifier as a load balancing value.

One embodiment includes: receiving, by a particular packet switching device, the backbone frame; processing, by the particular packet switching device, the modulated service instance identifier to generate the backbone service instance identifier (I-SID); and sending the particular frame from the particular packet switching device based on the backbone service instance identifier (I-SID). In one embodiment, said processing the modulated service instance identifier includes: determining the flow identification value from said one or more fields of the header of the particular frame, and demodulating the backbone service instance identifier (I-SID) from the modulated service instance identifier based on the flow identification value. In one embodiment, said demodulating the backbone service instance identifier (I-SID) from the modulated service instance identifier based on the flow identification value includes exclusive-ORing the modulated service instance identifier and the flow identification value.

In one embodiment, said one or more fields of the header of the particular frame include: the source and destination addresses of the particular frame. In one embodiment, said one or more fields of the header of the particular frame include: the source and destination addresses of the particular frame, and source and destination address of an Internet Protocol packet encapsulated within the particular frame. In one embodiment, said modulating the I-SID with the flow identification value to generate a modulated service instance identifier includes exclusive-ORing the backbone service instance identifier (I-SID) and the flow identification value.

One embodiment includes: receiving, by a packet switching device, a backbone frame including a modulated service instance identifier and a particular frame; processing the modulated service instance identifier to determine a backbone service instance identifier (I-SID) corresponding to the particular frame; and sending the particular frame from the packet switching device based on the backbone service instance identifier (I-SID), or sending of a modified backbone frame based on said received backbone frame with the modified backbone frame including the backbone service instance identifier (I-SID) and the particular frame.

In one embodiment, said processing the modulated service instance identifier includes: determining a flow identification value from one or more fields of the header of the particular frame, and demodulating the backbone service instance identifier (I-SID) from the modulated service instance identifier based on the flow identification value. In one embodiment, said demodulating the backbone service instance identifier (I-SID) from the modulated service instance identifier based on the flow identification value includes exclusive-ORing the modulated service instance identifier and the flow identification value.

2. Description

Disclosed are, inter alia, methods, apparatus, computer-storage media, mechanisms, and means associated with modifying backbone service instance identifiers (I-SIDs) of backbone frames based on flow identification of frames encapsulated therein.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, or other implementation for performing the corresponding processing. The embodiments described hereinafter embody various aspects and configurations, with the figures illustrating exemplary and non-limiting configurations. Note, computer-readable media and means for performing methods and processing block operations (e.g., a processor and memory or other apparatus configured to perform such operations) are disclosed and are in keeping with the extensible scope and spirit of the embodiments. Note, the term "apparatus" is used consistently herein with its common definition of an appliance or device.

Note, the steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

Expressly turning to the figures, FIG. 1 illustrates a network configured to operate, or operating, according to one embodiment. Shown are packet switching devices 100, 102, 106 and 108, with network 104 also including one or more packet switching devices. Of course, the network connectivity of an embodiment will vary from that shown in FIG. 1, but this network provides for the teaching of one or more embodiments.

In one embodiment, packet switching device 100 (e.g., a customer device) communicates a frame 101 (e.g., Ethernet frame) to packet switching device 102 (e.g., a provider backbone edge bridge), which in turn determines a backbone frame to encapsulate the received frame 101, with the backbone frame including forwarding information for use in forwarding through network 104 (e.g., a provider backbone network including backbone core bridges). This determined forwarding information includes a backbone service instance identifier (I-SID) associated with the received frame. The backbone service instance identifier (I-SID) is a typically used to identify a particular customer in a known provider backbone network.

Rather than use the original backbone service instance identifier (I-SID), one embodiment modifies backbone service instance identifier (I-SID) based on a flow identification derived from one or more fields of the received frame in a manner that will allow a subsequent packet switching device to recover the original backbone service instance identifier (I-SID) from the modulated service instance identifier. This allows, for example in one embodiment, packet switching devices in network 104 to load balance backbone provider frames based on included modulated service instance identifiers. When load balancing it is typically desirous that frames of a flow are load balanced in the same manner so frames traverse a network over a same path as to avoid reordering of frames at the receiving switch. Also, known hashing and other techniques can be used to produce a value based on the flow identification information which adds entropy when creating the modulated service instance identifier. This typically results in better load balancing of flows of frames.

Packet switching device 102 sends the resulting backbone frame 103, including the originally received frame and the modulated service instance identifier, into network 104, in which packet switching devices typically load balance the forwarding of packets based on the modulated service instance identifier, with this backbone frame 105 being communicated to packet switching device 106. Note that backbone frame 105 is typically the same as backbone frame 103. Packet switching device 106 demodulates the modulated service instance identifier to produce the original service instance identifier (I-SID), which may identify a corresponding customer. Packet switching device 106 typically sends, based on the service instance identifier (I-SID), the decapsulate frame 107 (e.g., the same frame as frame 101) to packet switching device 108.

Also illustrated in FIG. 1 is a network architecture in which packet switching devices 100 and/or 108 are aggregating (or other) devices which perform the known encapsulation of received frames into backbone frames (e.g., which include corresponding backbone service instance identifiers (I-SIDs)). Thus, in one embodiment, packet switching device 102 receives a backbone frame 101 including a backbone service instance identifier (I-SID) and encapsulated frame. Therefore, packet switching device 102 does not need to determine this backbone information, but rather, modifies the received backbone service instance identifier (I-SID) based on a flow identified for the encapsulated frame, and sends out a corresponding backbone frame 103, which includes the modulated service instance identifier. Similarly, packet switching device 106 receives the corresponding backbone frame 105 and demodulates the modulated service instance identifier to produce the backbone service instance identifier (I-SID) (e.g., the I-SID originally received by packet switching device 102 in backbone frame 101). In one embodiment, packet switching device 106 sends out frame 107 (e.g., an Ethernet frame/non-backbone frame). In one embodiment, packet switching device 106 sends out backbone frame 107 with the original, non-modulated backbone service instance identifier (I-SID).

Note that FIG. 1 illustrates processes of sending packets from packet switching device 100 to packet switching device 108, and from packet switching device 108 to packet switching device 100 with corresponding operations performed for sending packets in the desired direction. Also, in one embodiment, packet switching device 102 receives frame 101 (e.g., an Ethernet frame/non-backbone frame) and packet switching device 106 sends out corresponding frame 107 in the form of either a frame 107 (e.g., an Ethernet frame/non-backbone frame) or backbone frame 107.

Figure 2:
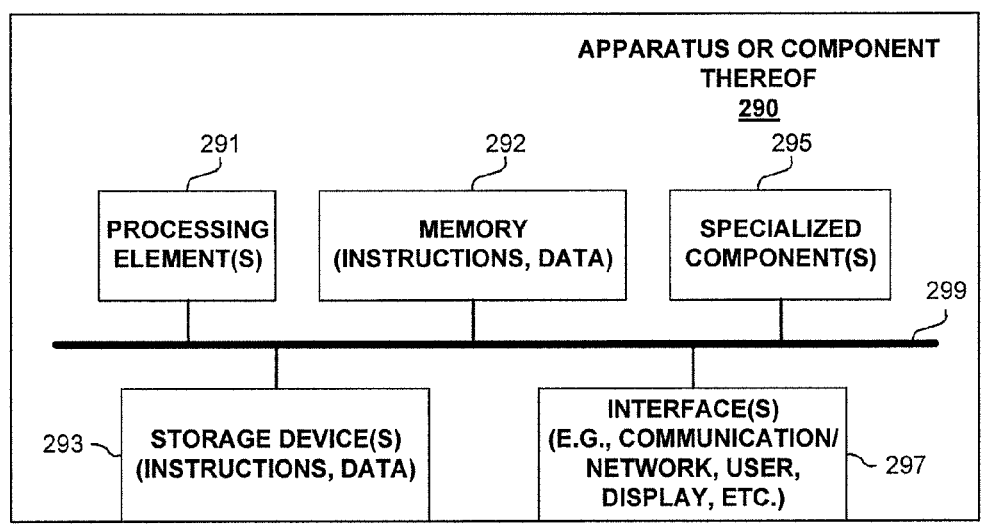
FIG. 2 illustrates an example apparatus according to one embodiment.

FIG. 2 is a block diagram of an apparatus or component 290 used in one embodiment associated with modifying backbone service instance identifiers (I-SIDs) of backbone frames based on flow identification of frames encapsulated therein. In one embodiment, apparatus or component 290 performs one or more processes corresponding to one of the flow diagrams illustrated or otherwise described herein, and/or illustrated in another diagram or otherwise described herein.

In one embodiment, apparatus or component 290 includes one or more processing element(s) 291, memory 292, storage device(s) 293, specialized component(s) 295 (e.g. optimized hardware such as for performing operations, etc.), and interface(s) 297 for communicating information (e.g., sending and receiving packets, user-interfaces, displaying information, etc.). These elements can be communicatively coupled via one or more communications mechanisms 299, with the communications paths typically tailored to meet the needs of a particular application. In one embodiment, apparatus or component 290 corresponds to, or is part of, a packet switching device (100, 102, 106, 108 or within network 104) of FIG. 1.

Various embodiments of apparatus or component 290 may include more or fewer elements. The operation of apparatus or component 290 is typically controlled by processing element(s) 291 using memory 292 and storage device(s) 293 to perform one or more tasks or processes. Memory 292 is one type of computer-readable/computer-storage medium, and typically comprises random access memory (RAM), read only memory (ROM), flash memory, integrated circuits, and/or other memory components. Memory 292 typically stores computer-executable instructions to be executed by processing element(s) 291 and/or data which is manipulated by processing element(s) 291 for implementing functionality in accordance with an embodiment. Storage device (s) 293 are another type of computer-readable medium, and typically comprise solid state storage media, disk drives, diskettes, networked services, tape drives, and other storage devices. Storage device(s) 293 typically store computer-executable instructions to be executed by processing element(s) 291 and/or data which is manipulated by processing element(s) 291 for implementing functionality in accordance with an embodiment.

Figure 3:
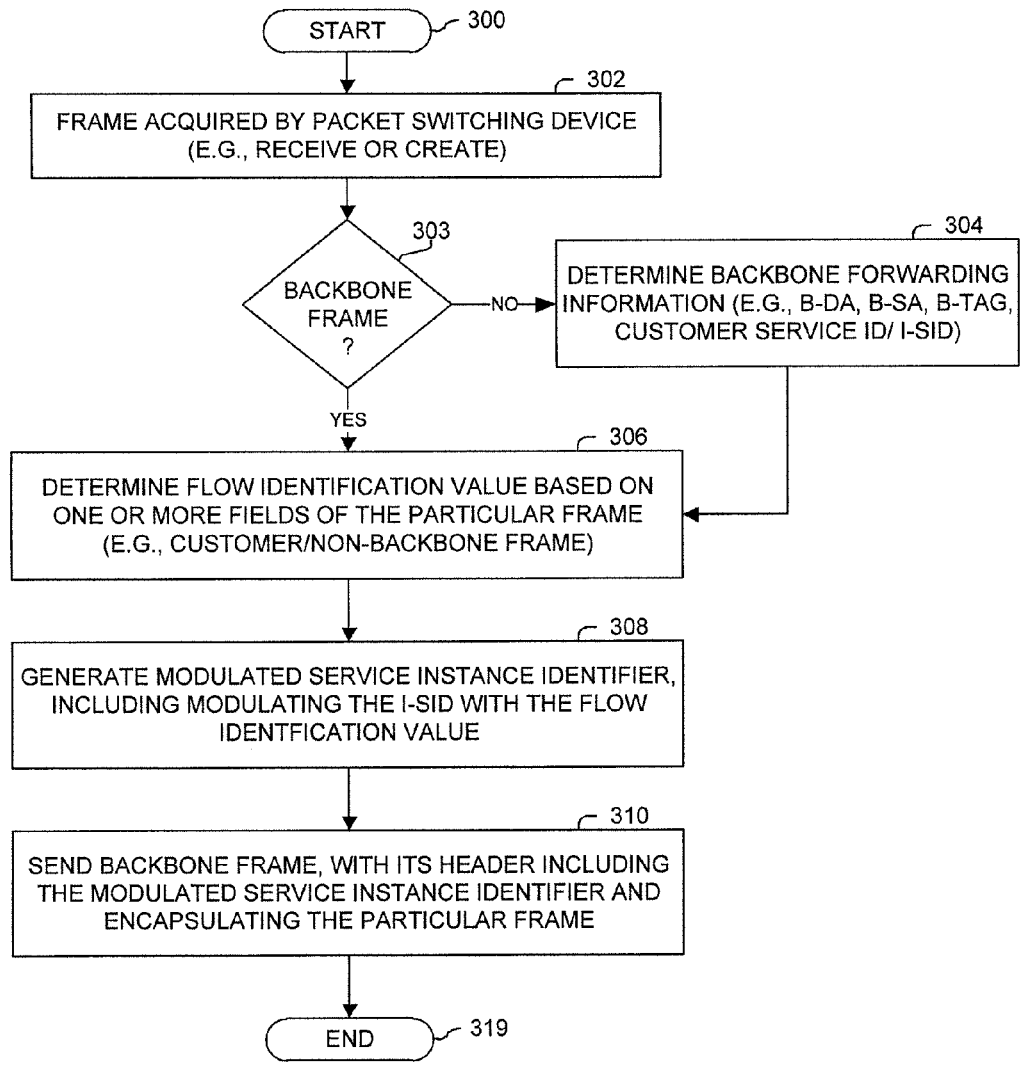
FIG. 3 illustrates an example process according to one embodiment.

FIG. 3 illustrates an example process configured to be performed, and/or is performed, in one embodiment typically by a single packet switching device (e.g., a switch or bridge). Processing begins with process block 300, and in process block 302, a frame is acquired (e.g., typically received but also could be created by the packet switching device). As determined in process block 303, if the received frame is not already a backbone frame, then in process block 304, the backbone forwarding information (e.g., backbone source and destination addresses, backbone service instance identifier (I-SID), possibly B-Tag, etc.) is determined.

Next, in process block 306, a flow identification value is determined based on one or more fields of the received particular frame (e.g., the received Ethernet/non-backbone frame, or the encapsulated frame in the received backbone frame). A flow is typically identified by an n-tuple of any layer-2, layer-3 or layer-4 information associated with the received frame. For example, one embodiment determines this flow identification value based on the MAC source and destination addresses. When an IP packet is encapsulated in the frame, one embodiment determines this flow identification value based on the MAC source and destination addresses and on the IP source and destination addresses, and possibly further based on UDP or TCP port numbers. Additionally, the value(s) of the one or more fields of the received particular frame, and possibly one or more values from the packet switching device, are typically hashed or otherwise manipulated to create the flow identification value in a manner to add entropy. There are numerous algorithms known for performing such hashing and manipulation to provide good, possibly random or pseudo-random, distribution of values based on different flows of frames and packets.

In process block 308, the modulated service instance identifier is generated, which typically includes modulating the backbone service instance identifier (I-SID) with the flow identification value. In one embodiment, the flow identification value and the backbone service instance identifier (I-SID) have the same number of bits, which are exclusive-ORed to produce the modified service instance identifier. Other techniques can be used to add entropy of the flow identification value to the backbone service instance identifier (I-SID) to create the modulated service instance identifier, from which the original backbone service instance identifier (I-SID) can be recovered by another packet switching device.

In process block 310, the backbone frame, with its header including the modulated service instance identifier and the frame encapsulated there in is sent from the packet switching device. In one embodiment, the backbone frame includes a B-tag. In one embodiment, the backbone frame does not include a B-tag. In one embodiment, the backbone frame includes a 4-bit time-to-live value (TTL) and 24-bit modulated service instance identifier (I-SID). In one embodiment, the backbone frame includes a 6-bit time-to-live value (TTL) and a 20-bit modulated service instance identifier. In one embodiment, the backbone frame includes a modulated service instance identifier having a different number of bits than twenty or twenty-four bits.

Processing of the flow diagram of FIG. 3 is completed as indicated by process block 319.

Figure 4:
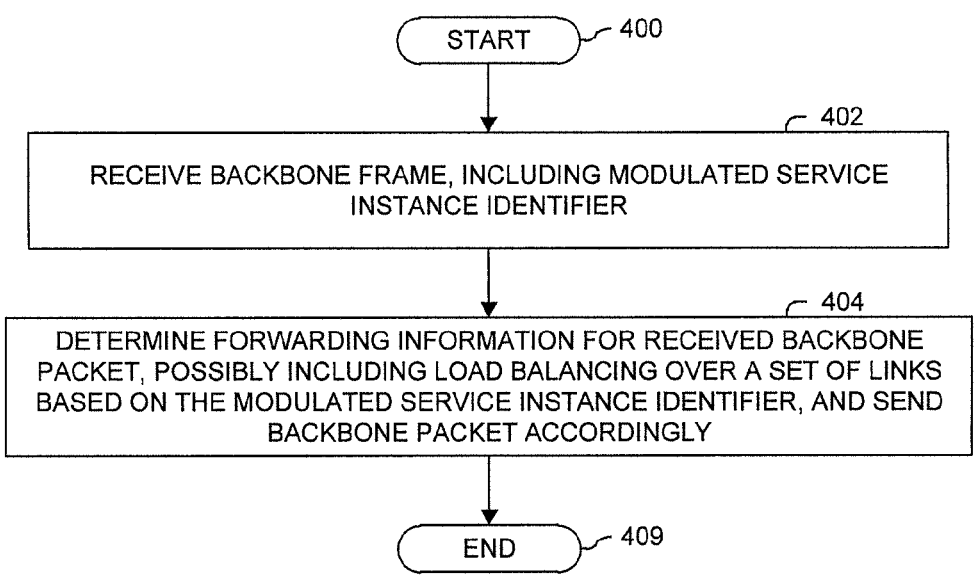
FIG. 4 illustrates an example process according to one embodiment.

FIG. 4 illustrates an example process configured to be performed, and/or performed, in one embodiment typically by a single packet switching device (e.g., a switch or bridge). Processing begins with process block 400. In process block 402, a backbone frame, including a modulated service instance identifier, is received. In process block 404, the forwarding information for the received backbone packet is determined, which may include load balancing the backbone packet over a set of links based on using a modulated service instance identifier as a load balancing value to identify a particular link from the set of equal cost links. The backbone frame is sent accordingly from the packet switching device. Processing of the flow diagram of FIG. 4 is completed as indicated by process block 409.

Figure 5:
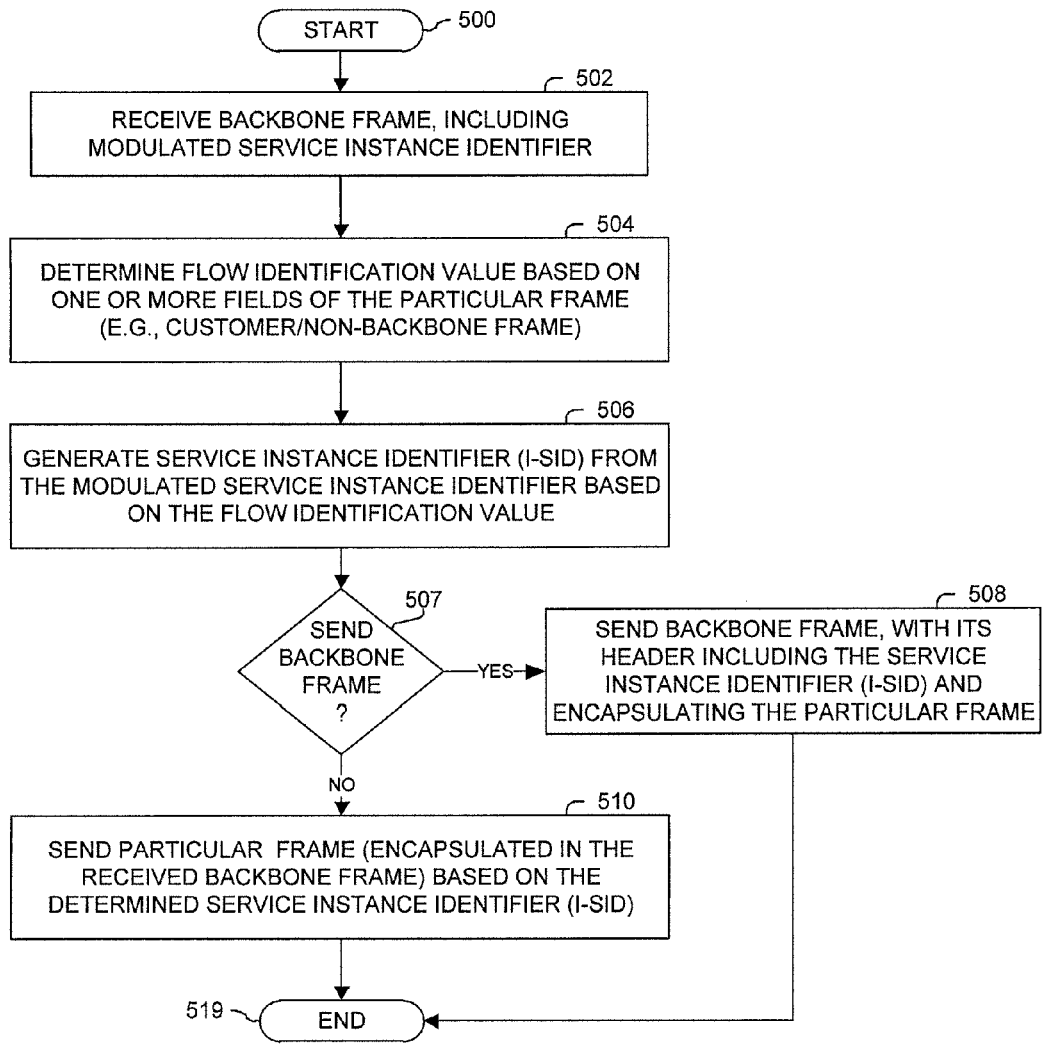
FIG. 5 illustrates an example process according to one embodiment.

FIG. 5 illustrates an example process configured to be performed, and/or performed, in one embodiment. Processing begins with process block 500. In process block 502, a backbone frame, including a modulated service instance identifier, is received. In process block 504, the flow identification value is determined based on one or more fields of the particular frame. Note that this operation is typically the same as performed in process block 306 of FIG. 3 so as to result in the same flow identification value. In process block 506, the original service instance (I-SID) is determined from the modulated service instance identifier based on the flow identification value. A different technique can be used to generate the flow identification value other than that used in process block 306 as long as the original service instance (I-SID) can be recovered from the received modulated service instance identifier.

As determined in process block 507, if a backbone frame is to be sent out, then in process block 508, a modified backbone frame, based on said received backbone frame, is sent from the packet switching device with the modified backbone frame including the backbone service instance identifier (I-SID) and the particular frame. Otherwise, if it was determined in process block 507 to send out the particular frame, in process block 510, the particular frame is sent from the packet switching device based on the recovered backbone service instance identifier (I-SID). Processing of the flow diagram of FIG. 5 is completed as indicated by process block 519.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   determining a flow identification value derived from one or more fields of the header of a particular frame;
   generating a modulated service instance identifier, which includes modulating a backbone service instance identifier (I-SID) associated with the particular frame with the flow identification value, with said modulating including performing a function with operands of the backbone service instance identifier (I-SID) and the flow identification value resulting in the modulated service instance identifier with the backbone service instance identifier (I-SID) being recoverable from the modulated service instance identifier and the flow identification value; and
   sending, from a first packet switching device into a network, a backbone frame encapsulating the particular frame, with the header of the backbone frame including the modulated service instance identifier;
   receiving, at a particular packet switching device, the backbone frame;
   processing, at the particular packet switching device, the modulated service instance identifier to generate the backbone service instance identifier (I-SID), with said processing the modulated service instance identifier including determining the flow identification value from said one or more fields of the header of the particular frame and demodulating the backbone service instance identifier (I-SID) from the modulated service instance identifier based on the flow identification value, with said demodulating the backbone service instance identifier (I-SID) from the modulated service instance identifier based on the flow identification value including performing an exclusive-OR operation on the modulated service instance identifier and the flow identification value; and
   sending the particular frame from the particular packet switching device based on the backbone service instance identifier (I-SID).

2. The method of claim 1, comprising:
   receiving, at the first packet switching device, the particular frame;
   determining, at the first packet switching device, the backbone service instance identifier (I-SID) corresponding to the particular frame; and
   encapsulating the particular frame to produce the backbone frame, with the header of the backbone frame including the modulated service instance identifier.

3. The method of claim 1, comprising: a second packet switching device in the network communicating the backbone frame to a third packet switching device; wherein said communicating includes load balancing the backbone frame across a plurality of links based on using the modulated service instance identifier as a load balancing value.

4. The method of claim 1, wherein said modulating the I-SID with the flow identification value to generate a modulated service instance identifier includes performing an exclusive-OR operation on the backbone service instance identifier (I-SID) and the flow identification value.

5. The method of claim 1, wherein said determining the flow identification value derived from one or more fields of the header of the particular frame includes determining the flow identification value derived from at least two fields of the header of the particular frame; wherein said at least two fields of the header of the particular frame used in determining the flow identification value include both the source address and destination address of the particular frame.

6. A method, comprising:
   determining a flow identification value derived from one or more fields of the header of a particular frame;

generating a modulated service instance identifier, which includes modulating a backbone service instance identifier (I-SID) associated with the particular frame with the flow identification value; and sending, from a first packet switching device into a network, a backbone frame encapsulating the particular frame, with the header of the backbone frame including the modulated service instance identifier;

wherein said modulating the I-SID with the flow identification value to generate a modulated service instance identifier includes performing an exclusive-OR operation on the backbone service instance identifier (I-SID) and the flow identification value.

7. A method, comprising:

receiving, at a packet switching device, a backbone frame including a modulated service instance identifier and a particular frame;

processing the modulated service instance identifier to determine a backbone service instance identifier (I-SID) corresponding to the particular frame, wherein said processing the modulated service instance identifier includes: determining a flow identification value from at least two fields of the header of the particular frame, and demodulating the backbone service instance identifier (I-SID) from the modulated service instance identifier based on the flow identification value; and sending the particular frame from the packet switching device based on the backbone service instance identifier (I-SID), or sending of a modified backbone frame based on said received backbone frame with the modified backbone frame including the backbone service instance identifier (I-SID) and the particular frame;

wherein said demodulating the backbone service instance identifier (I-SID) from the modulated service instance identifier based on the flow identification value includes performing an exclusive-OR operation on the modulated service instance identifier and the flow identification value.

8. A packet switching device, comprising:

a plurality of interfaces configured to send and receive packets;

memory; and one or more processors perform operations, including:
  determining a flow identification value derived from one or more fields of the header of a particular frame; and
  generating a modulated service instance identifier, which includes modulating a backbone service instance identifier (I-SID) associated with the particular frame with the flow identification value, with said modulating including performing a function with operands of the backbone service instance identifier (I-SID) and the flow identification value resulting in the modulated service instance identifier with the backbone service instance identifier (I-SID) being recoverable from the modulated service instance identifier and the flow identification value;

wherein the packet switching device is configured to send a backbone frame encapsulating the particular frame, with the header of the backbone frame including the modulated service instance identifier;

wherein said modulating the I-SID with the flow identification value to generate a modulated service instance identifier includes performing an exclusive-OR operation on the backbone service instance identifier (I-SID) and the flow identification value.

9. The packet switching device of claim 8, wherein said operations include:

determining the backbone service instance identifier (I-SID) corresponding to the particular frame received on one of the plurality of interfaces; and encapsulating the particular frame to produce the backbone frame, with the header of the backbone frame including the modulated service instance identifier.

10. The packet switching device of claim 8, wherein said determining the flow identification value derived from one or more fields of the header of the particular frame includes determining the flow identification value derived from at least two fields of the header of the particular frame; wherein said at least two fields of the header of the particular frame used in determining the flow identification value include both the source address and destination address of the particular frame.

11. A packet switching device, comprising:

a plurality of interfaces configured to send and receive packets;

memory; and one or more processors configured to perform operations, including processing a modulated service instance identifier of a received backbone frame to determine a backbone service instance identifier (I-SID) corresponding to a particular frame encapsulated within the received backbone frame; and wherein the packet switching device is configured to: send the particular frame based on the backbone service instance identifier (I-SID), or to send a modified backbone frame based on the received backbone frame with the modified backbone frame including the backbone service instance identifier (I-SID) and the particular frame;

wherein said processing the modulated service instance identifier includes: determining a flow identification value from at least two fields of the header of the particular frame, and demodulating the backbone service instance identifier (I-SID) from the modulated service instance identifier based on the flow identification value; and wherein said demodulating the backbone service instance identifier (I-SID) from the modulated service instance identifier based on the flow identification value includes performing an exclusive-OR operation on the modulated service instance identifier and the flow identification value.

12. A method, comprising:

determining a flow identification value derived from one or more fields of the header of a particular frame;

generating a modulated service instance identifier, which includes modulating a backbone service instance identifier (I-SID) associated with the particular frame with the flow identification value, with said modulating including performing a function with operands of the backbone service instance identifier (I-SID) and the flow identification value resulting in the modulated service instance identifier with the backbone service instance identifier (I-SID) being recoverable from the modulated service instance identifier and the flow identification value; and sending, from a first packet switching device into a network, a backbone frame encapsulating the particular frame, with the header of the backbone frame including the modulated service instance identifier;

wherein said modulating the I-SID with the flow identification value to generate a modulated service instance identifier includes performing an exclusive-OR operation on the backbone service instance identifier (I-SID) and the flow identification value.

* * * * *